(12) United States Patent
Kuo

(10) Patent No.: US 7,375,899 B2
(45) Date of Patent: May 20, 2008

(54) COMPACT ZOOM LENS

(75) Inventor: Chung-Yuan Kuo, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/465,067

(22) Filed: Aug. 16, 2006

(65) Prior Publication Data

US 2007/0121214 A1 May 31, 2007

(30) Foreign Application Priority Data

Aug. 24, 2005 (TW) .............................. 94129006 A (51) Int. Cl.
*G02B 15/14* (2006.01)
(52) U.S. Cl. ...................... 359/676; 359/680; 359/683
(58) Field of Classification Search ......... 359/676–686
See application file for complete search history.

(56) References Cited

U.S. PATENT DOCUMENTS

| | | | |
|---|---|---|---|
| 5,619,381 A | 4/1997 | Anderson | 359/677 |
| 6,480,340 B1 * | 11/2002 | Yamamoto | 359/676 |
| 6,590,716 B2 | 7/2003 | Narimatsu | 359/679 |
| 6,809,877 B2 * | 10/2004 | Nagahara | 359/676 |
| 7,079,324 B2 * | 7/2006 | Yamasaki | 359/680 |

* cited by examiner

*Primary Examiner*—M. Hasan (57) ABSTRACT

A compact zoom lens includes, in order from an object side to an image side, a first lens group (1) of negative refractive power, and second, third, fourth and fifth lens groups (2, 3, 4, 5) of positive refractive power. The second, third and fourth lens groups are movable to effect zooming and focusing. During zooming from the telephoto end to the wide-angle end, the fourth lens group moves from the object side to the image side. The compact zoom lens has a long back focal length with various aberrations satisfactorily corrected, and a small F-number for enhanced image brightness.

23 Claims, 13 Drawing Sheets

COMPACT ZOOM LENS

BACKGROUND OF THE INVENTION

1. Field of the Invention

The present invention relates to a zoom lens, and particularly relates to a compact zoom lens for use in an image projection optical system of an image projection device and also for use in an image pickup optical system of an image pickup device. The present zoom lens offers a long back focal length and high-resolution combined with high image brightness with a compact package, and is particularly suitable for use in a mobile image projection device.

2. Description of Prior Art

As an important element of an image projection optical system or an image pickup optical system, optical lenses are generally required to satisfy the high zoom ratio, high-resolution and high image quality requirements. A high zoom ratio lens generally consists of a plurality of lens groups and a considerable number of constituent lens elements, whereby the overall length of the lens is rather long. To meet the additional high-resolution requirement, special low dispersion lens elements and aspheric lens elements are Her incorporated in the lens. Conventional zoom lenses are generally designed for image pickup purposes, and accordingly the back focal length of the zoom lens is normally short but can meet the requirements of the image pickup device. However, such a conventional zoom lens cannot be applied to an image projection device due to its short back focal length. For example, for a liquid crystal projector, a projection zoom lens used therein is required to have a long enough back focal length to provide room for a color separating and synthesizing optical system of the projector and also to satisfy the high resolution requirement conforming to the high resolution of the liquid crystal panels of the projector. Further, high image quality with enhanced image brightness is often required for a zoom lens. As a rule, the smaller the F-number (expressed as the focal length of the lens divided by the effective aperture diameter), the brighter the lens. A single lens usually has a small F-number, whereas a zoom lens usually has a large F-number, so the view appears dark and manual focusing becomes difficult. Accordingly, a zoom lens with a small F-number is desired for enhanced image brightness and hence better image quality. To satisfy all these requirements as discussed above, various zoom lenses for use in an image projection optical system have been proposed, for example, in U.S. Pat. Nos. 6,590,716 and 5,619,381.

U.S. Pat. No. 6,590,716 discloses a conventional projection zoom lens that comprises four lens groups including twelve or thirteen constituent lens elements. The overall focal length of this projection zoom lens is variable between approximately 28 mm at the wide angle end and a value between 37 mm and 38 mm at the telephoto end. The F-number is 1.7 to 2.0. This conventional projection zoom lens effectively reduces various aberrations and improves the quality of a projected image. However, there is recently not only a demand for an image with high resolution but also a demand for reduction in size and weight of the projector with importance attached to maneuverability and portability of the projector with a small panel. Compact projectors have been found to be incorporated into notebook computers, desktop computers, DVDs, and so on. Therefore, this conventional projection zoom lens is not fit for use in a compact projector because an optical system employing the four-group zoom lens, which has an overall focal length between 28 mm and 38 mm, will be bulky. Further, The F-number of this conventional projection zoom lens, which is 1.7 to 2.0, may also not satisfy the requirement for a bright image in some cases.

A compact two-group movable lens is disclosed in U.S. Pat. No. 5,619,381. This compact two-group lens includes a zoom lens group having a negative refractive power and a compensator group having a positive refractive power. Each group contains at least one aspheric lens element for elimination of aberrations. A projection optical system employing this movable lens has a low distortion and high resolution with fewer lens elements. However, this patent only roughly introduces the configuration and the function of the two-group movable lens, and does not provide any detailed description of conditions and parameters necessary to the design.

To obtain the desired zoom ratio, image resolution and optical performance within the entire zoom range, the lens configuration for each lens group of a projection zoom lens must be carefully designed. When the refractive power of the lens group is increased, the movement stroke of the lens group during zooming will be shortened and thus the overall length of the zoom lens can be reduced. However, the increase in refractive power of the lens group will bring the problem of aberration fluctuations during zooming, and these aberration fluctuations are difficult to correct.

Accordingly, how to reduce the size and weight of the whole zoom lens system while maintaining high optical performance is a problem encountered by a zoom lens designer.

SUMMARY OF THE INVENTION

Accordingly, the object of the present invention is to provide a compact zoom lens with a relatively simplified lens configuration having high optical performance and high image resolution combined with enhanced image brightness, and being low-cost while a sufficient back focal length required for a projector is secured, To achieve the above object of the present invention, a compact zoom lens in accordance with the present invention comprises, in order from an object side to an image side, a first lens group of negative refractive power, a second lens group of positive refractive power, a third lens group of positive refractive power, a fourth lens group of positive refractive power and a fifth lens group of positive refractive power. The second, third and fourth lens groups are movable for effecting zooming and focusing. When zooming from the telephoto end to the wide-angle end, the fourth lens group moves from the object side to the image side. When zooming from the wide-angle end to the telephoto end, both the second and the third lens groups move from the object side to the image side.

The present compact zoom lens satisfies the following conditions:

$$0.499 < \frac{fa}{bf} \qquad \text{(a-1)}$$

$$\frac{tt}{fa} < 6.36 \qquad \text{(a-2)}$$

$$\frac{tt}{bf} < 3.17 \qquad \text{(a-3)}$$

-continued $$\left|\frac{ex}{bf}\right| < 8.153 \quad (a\text{-}4)$$

$$0.685 < \frac{lt}{tt} \quad (a\text{-}5)$$

where fa represents the focal length of the entire compact zoom lens of the present invention at the wide-angle end, bf represents the back focal length of the entire compact zoom lens of the present invention at the wide-angle end, tt represents the total track of the entire compact zoom lens of the present invention at the wide-angle end, ex represents the exit pupil position of the entire compact zoom lens of the present invention at the wide-angle end, and lt represents the overall length from a front vertex of the first lens element to a rear vertex of the last lens element of the present compact zoom lens at the wide-angle end.

To correct aberrations, aspheric lenses are employed by the present compact zoom lens. The aspheric surfaces of the aspheric lenses are expressed by the following formula:

$$\frac{X(H^2/R)}{\{1 + [1 - 2(1+K)(H/R)]^{1/2}\}} + AH^4 + BH^6 + CH^8 + DH^{10}$$

where X represents displacement in the direction of the optical axis at the position of height H from the optical axis relative to the surface vertex; R is the curvature radius of the aspheric lens surface on the optical axis; H represents a height of a point on the aspheric surface with respect to the optical axis; K represents a cone constant; and A, B, C and D are aspheric coefficients for fourth, sixth, eighth and tenth order terms.

In comparison with the prior art, the present zoom lens has a compact structure and thus is cost-effective. A long back focal length for various aberration corrections is also secured by the present compact zoom lens. Both zooming and focusing are effected by the movement of the second, third and fourth lens groups. Various aberrations accompanying zooming can be effectively corrected so as to ensure high optical performance. When the present zoom lens is applied to an image projection device employing liquid crystal displays, a small-size, light-weight and low-cost projector can be obtained while ensuring a high-resolution and enhanced brightness projection image.

BRIEF DESCRIPTION OF THE DRAWINGS

The present invention may best be understood through the following description with reference to the accompanying drawings, in which.

DETAILED DESCRIPTION OF THE INVENTION

Figure 1:
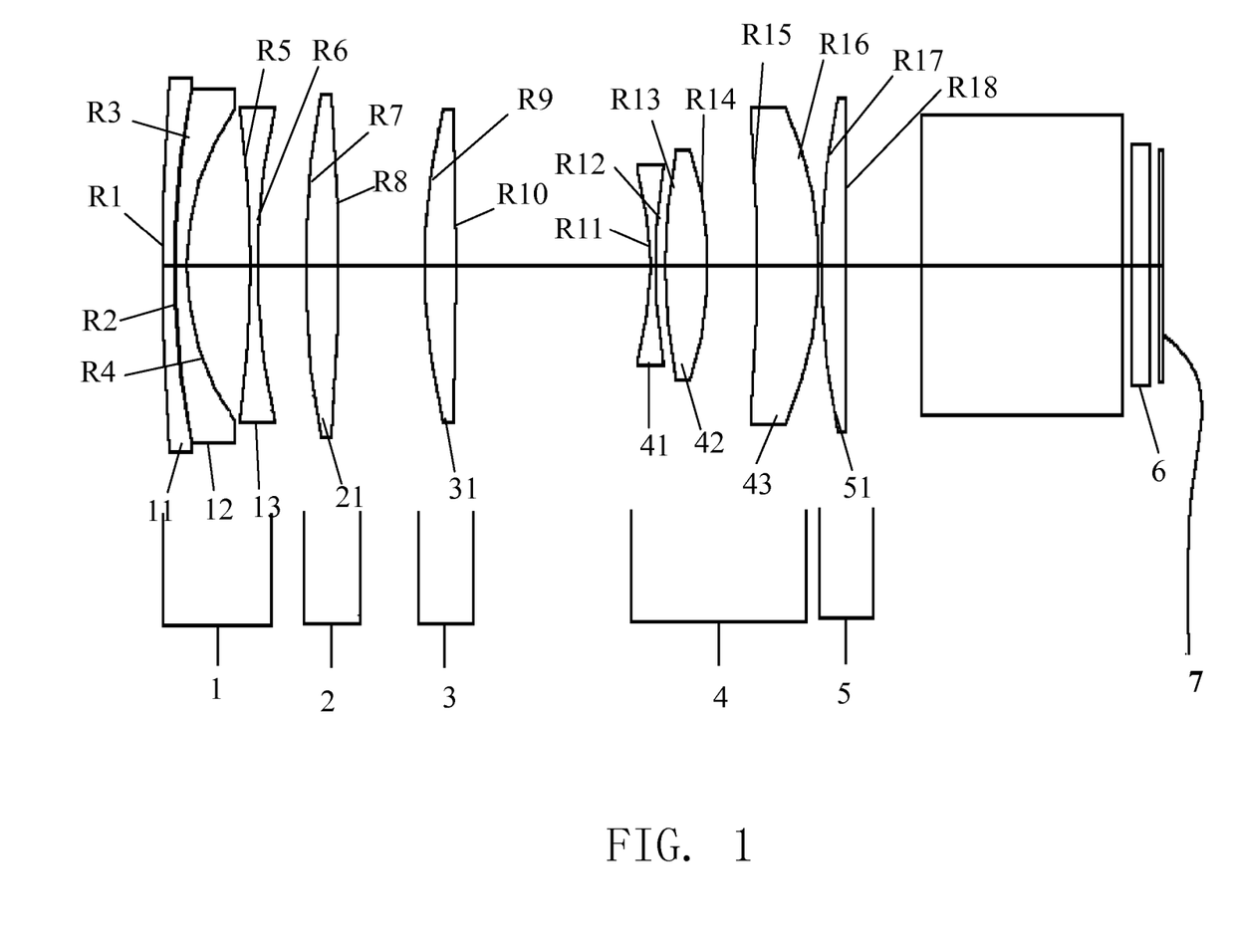
FIG. 1 schematically shows the construction of a compact zoom lens according to the concept of the present invention.
Figure 2A:
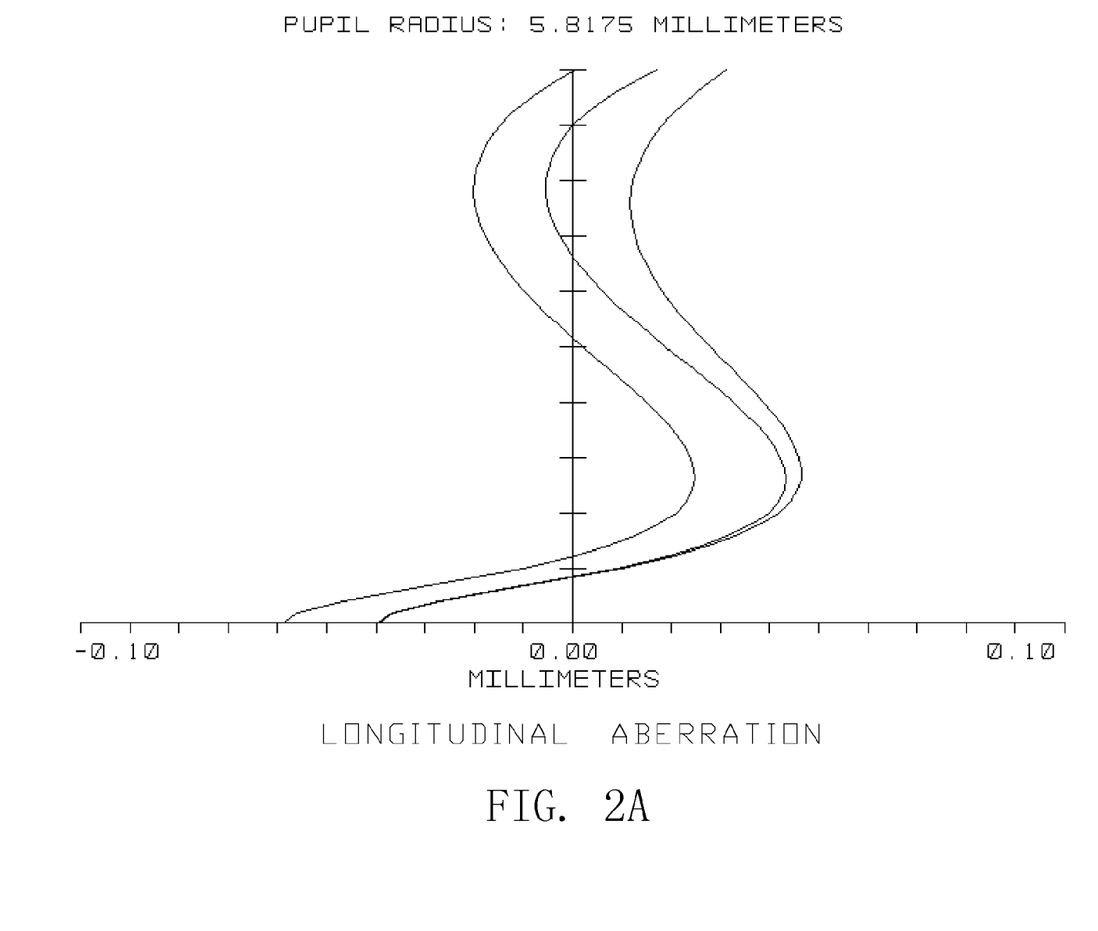
FIGS. 2A~2E respectively show longitudinal spherical aberration, lateral chromatic aberration, astigmatism, distortion and MTF curves of the present compact zoom lens at the wide-angle end.
Figure 2B:
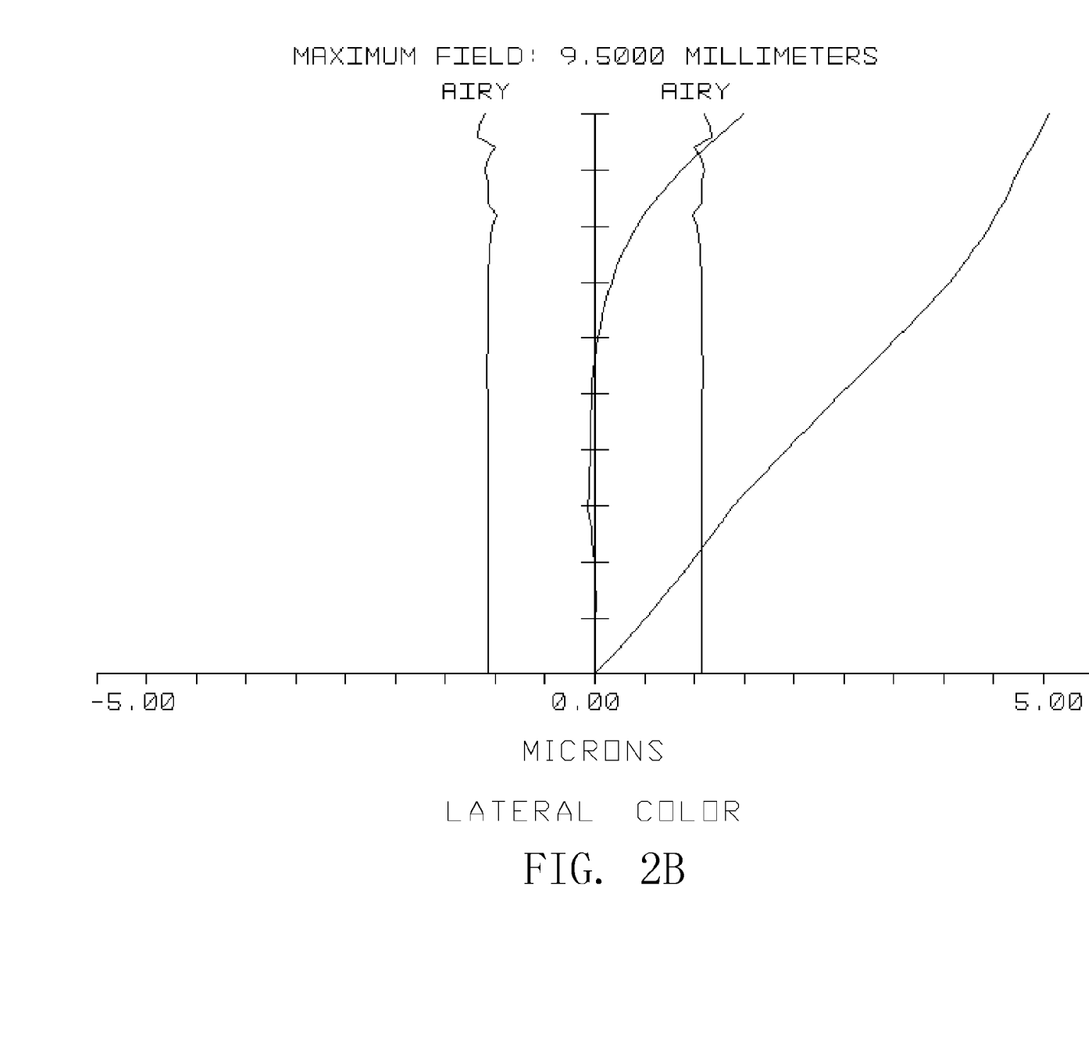
Figure 2C:
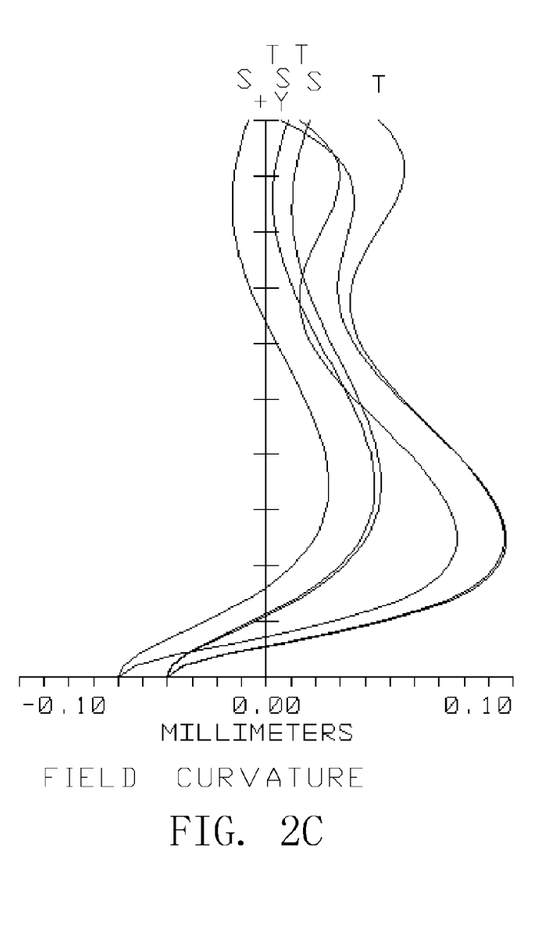
Figure 2D:
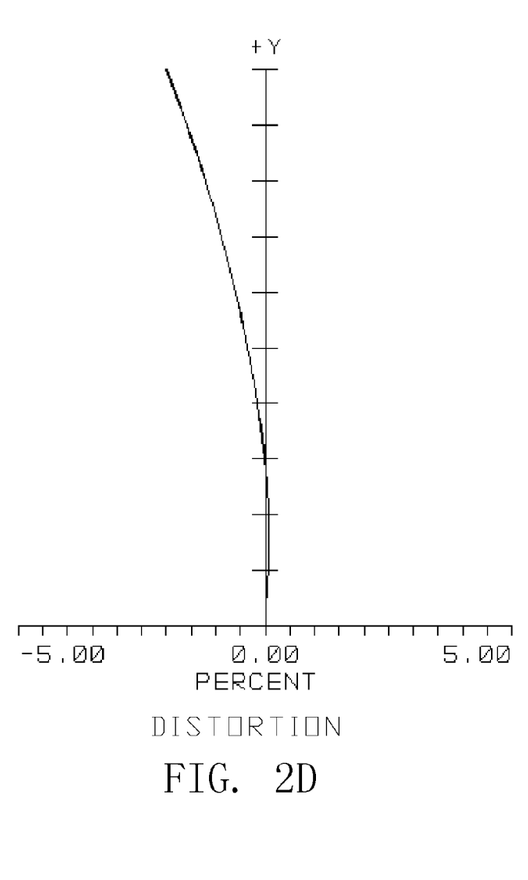
Figure 2E:
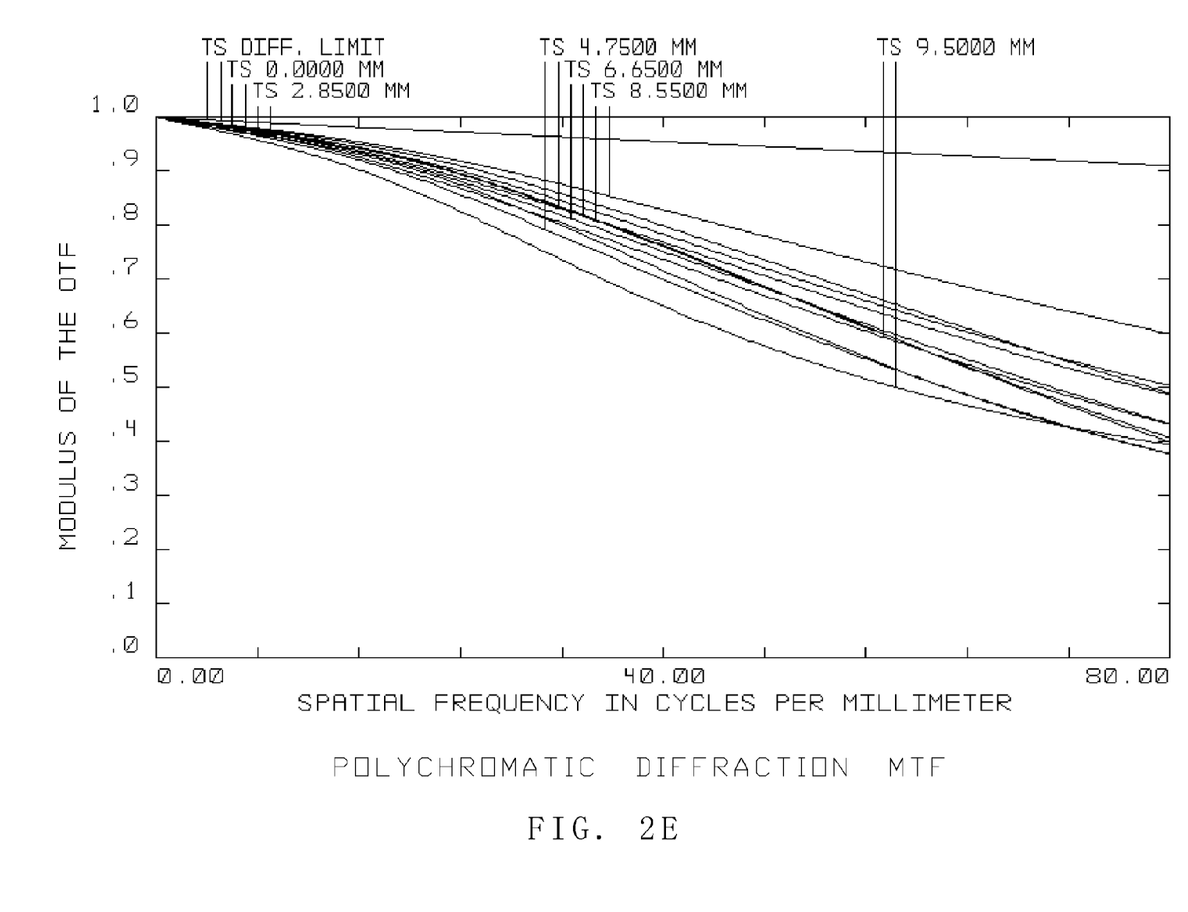
Figure 3A:
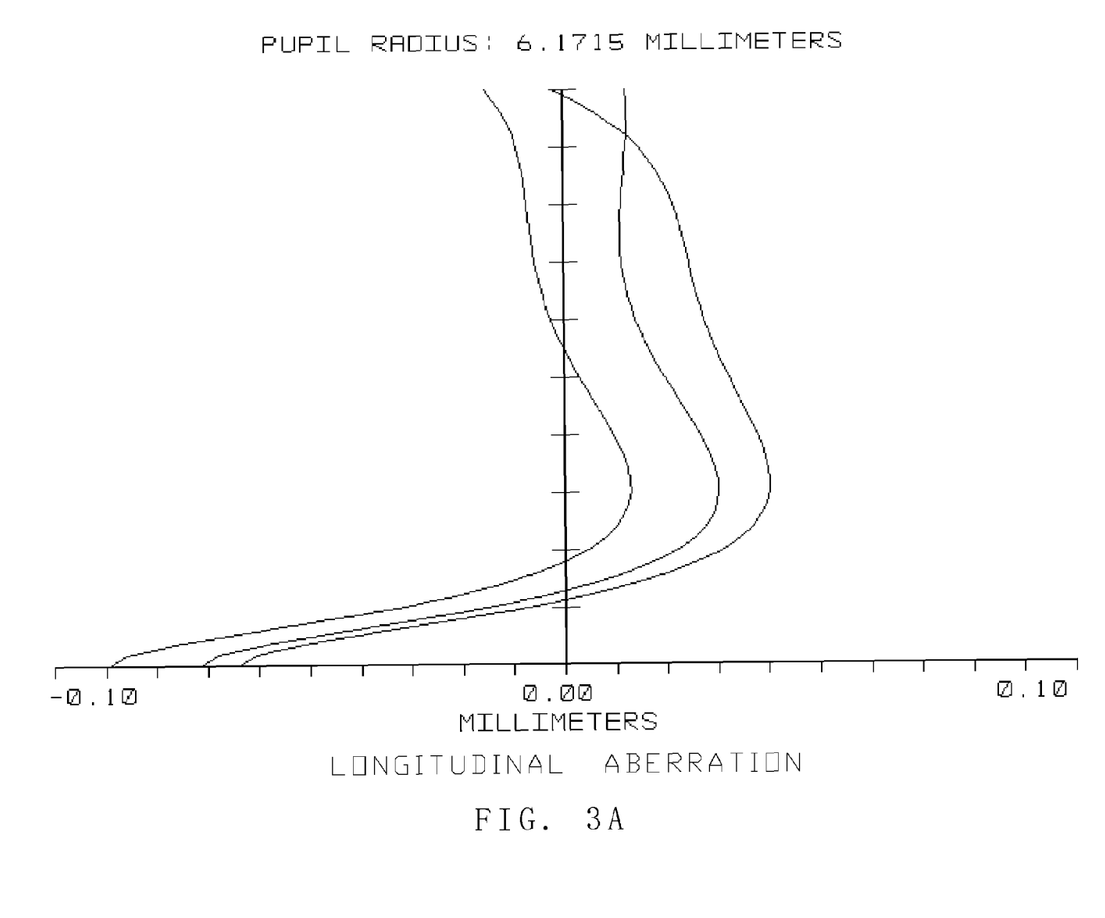
FIGS. 3A~3E respectively show longitudinal spherical aberration, lateral chromatic aberration, astigmatism, distortion and MTF curves of the present compact zoom lens at an intermediate zoom position.
Figure 3B:
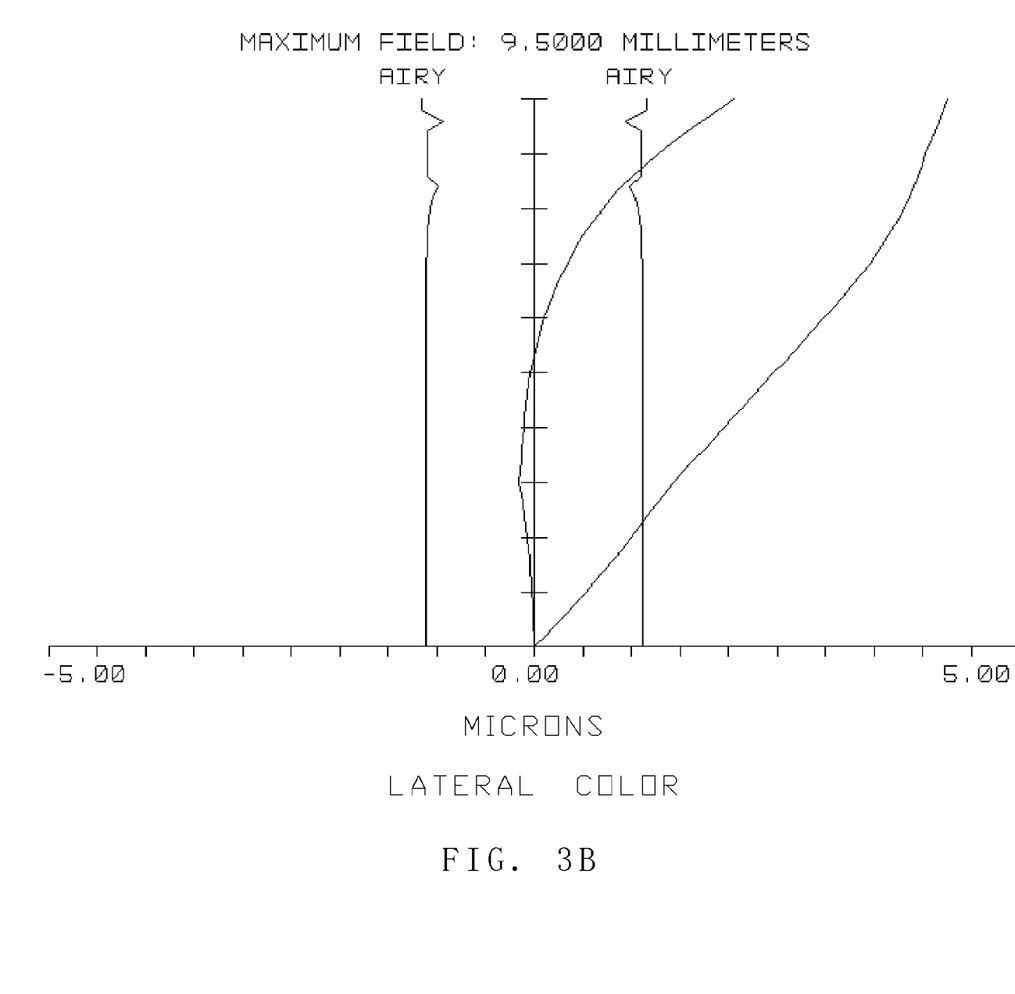
Figure 3C:
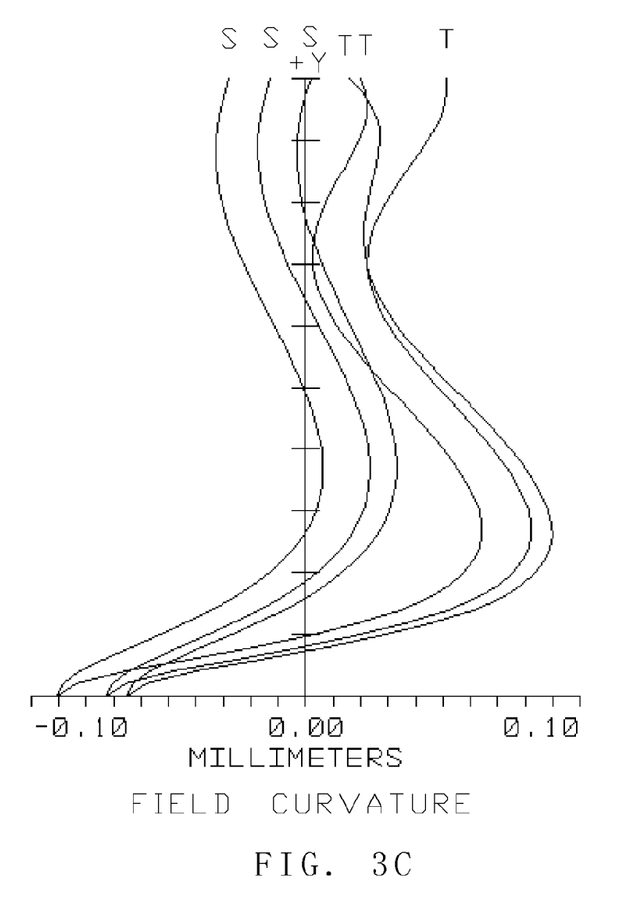
Figure 3D:
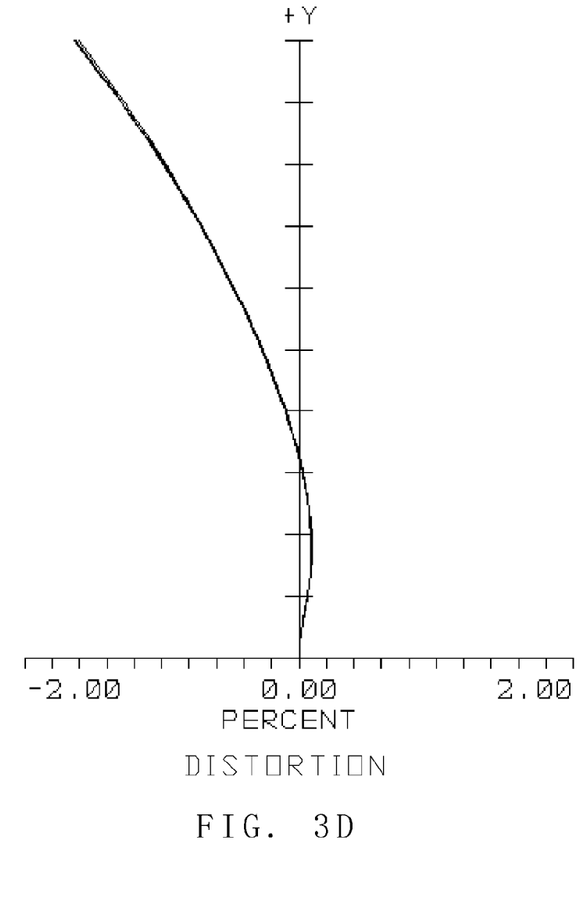
Figure 3E:
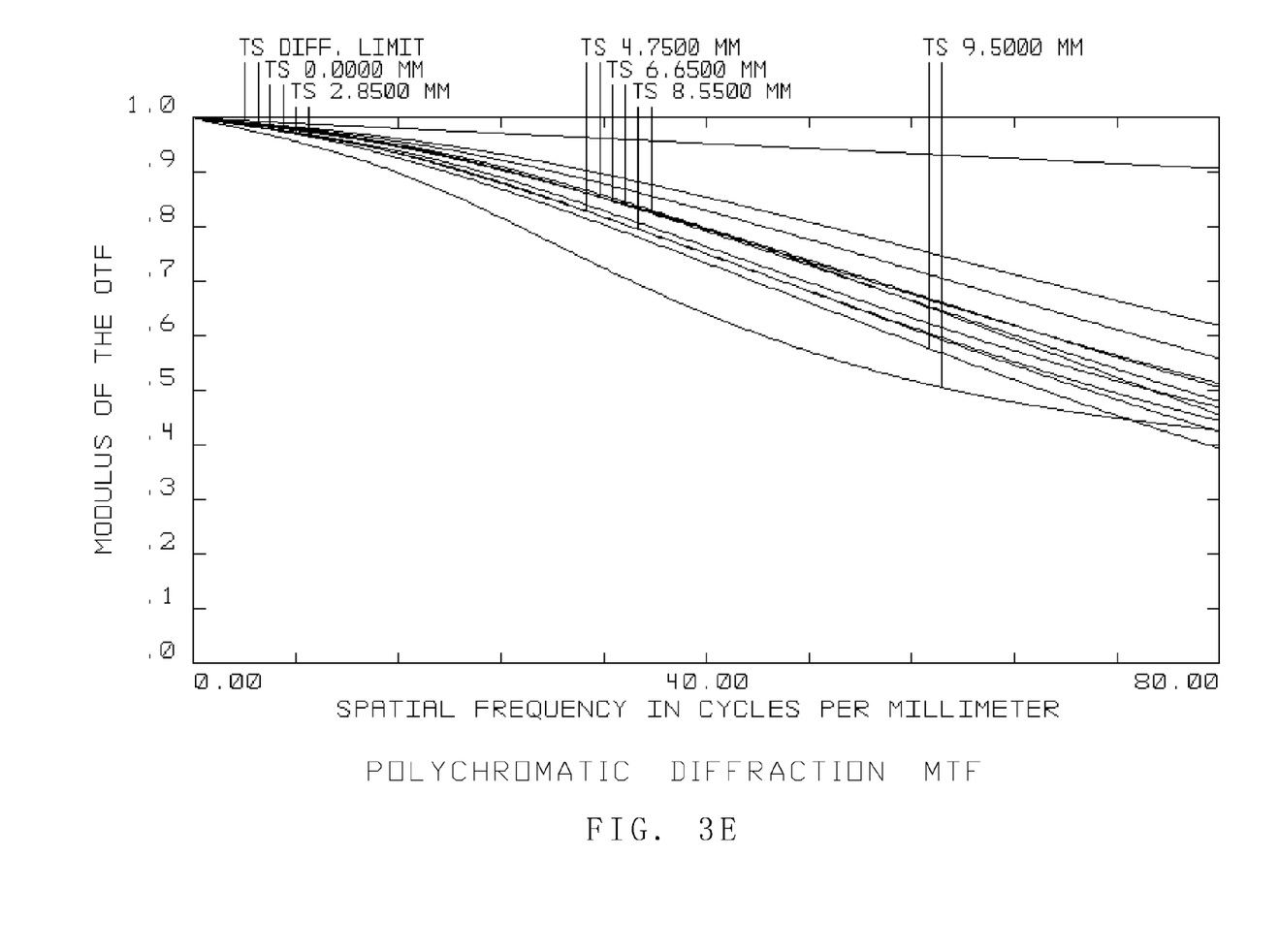
Figure 4A:
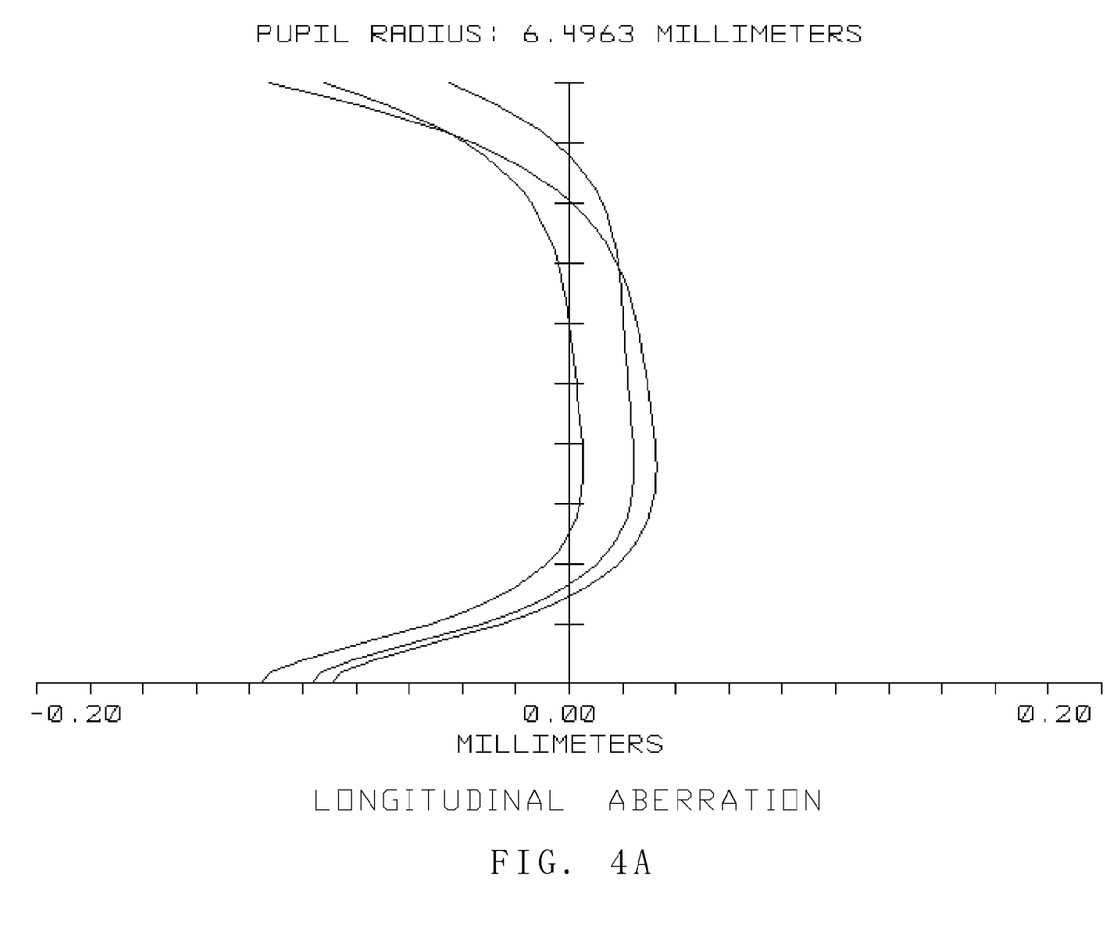
FIGS. 4A~4E respectively show longitudinal spherical aberration, lateral chromatic aberration, astigmatism, distortion and MTF curves of the present compact zoom lens at the telephoto end.
Figure 4B:
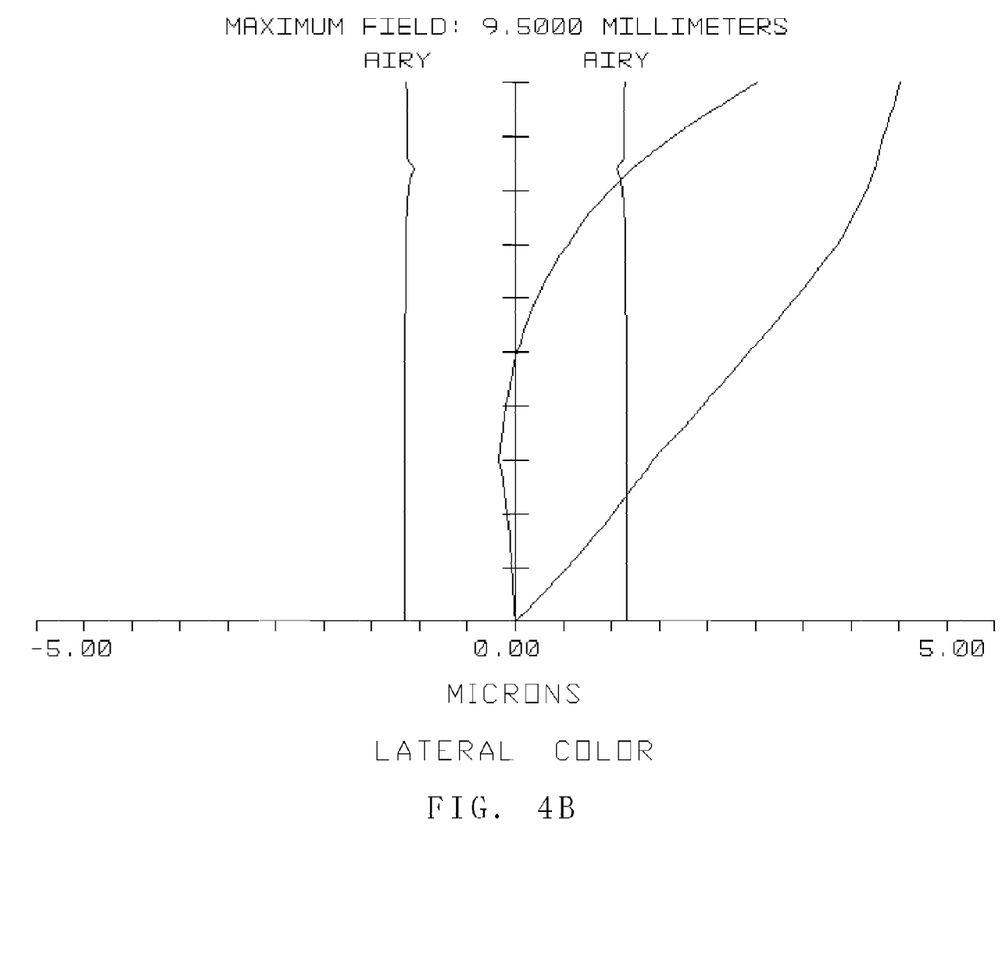
Figure 4C:
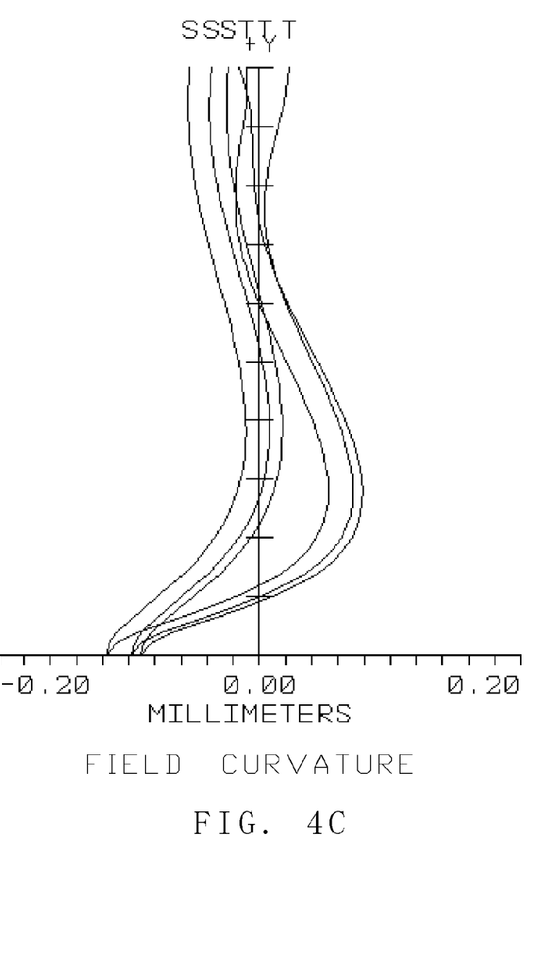
Figure 4D:
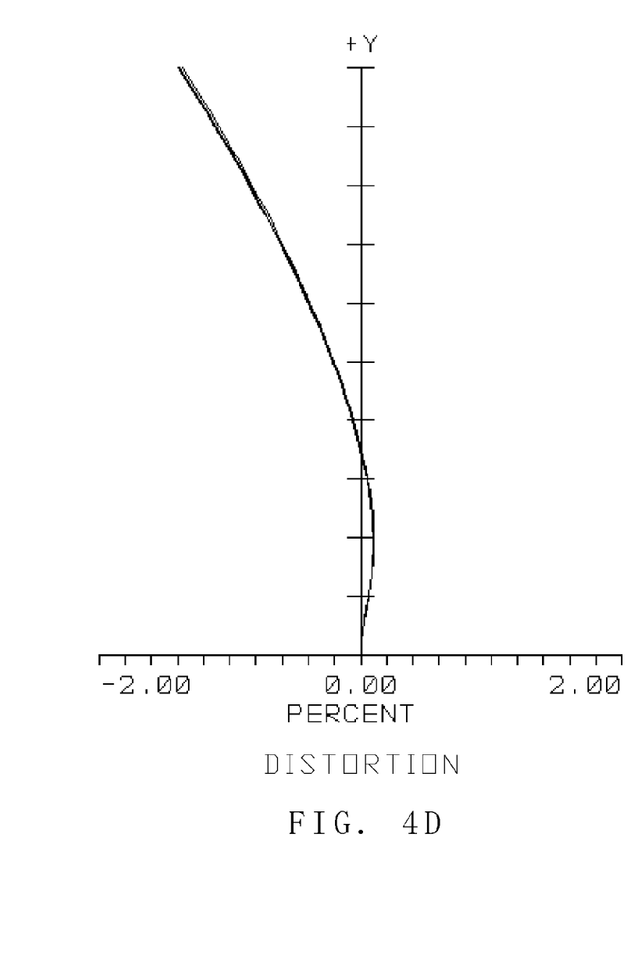
Figure 4E:
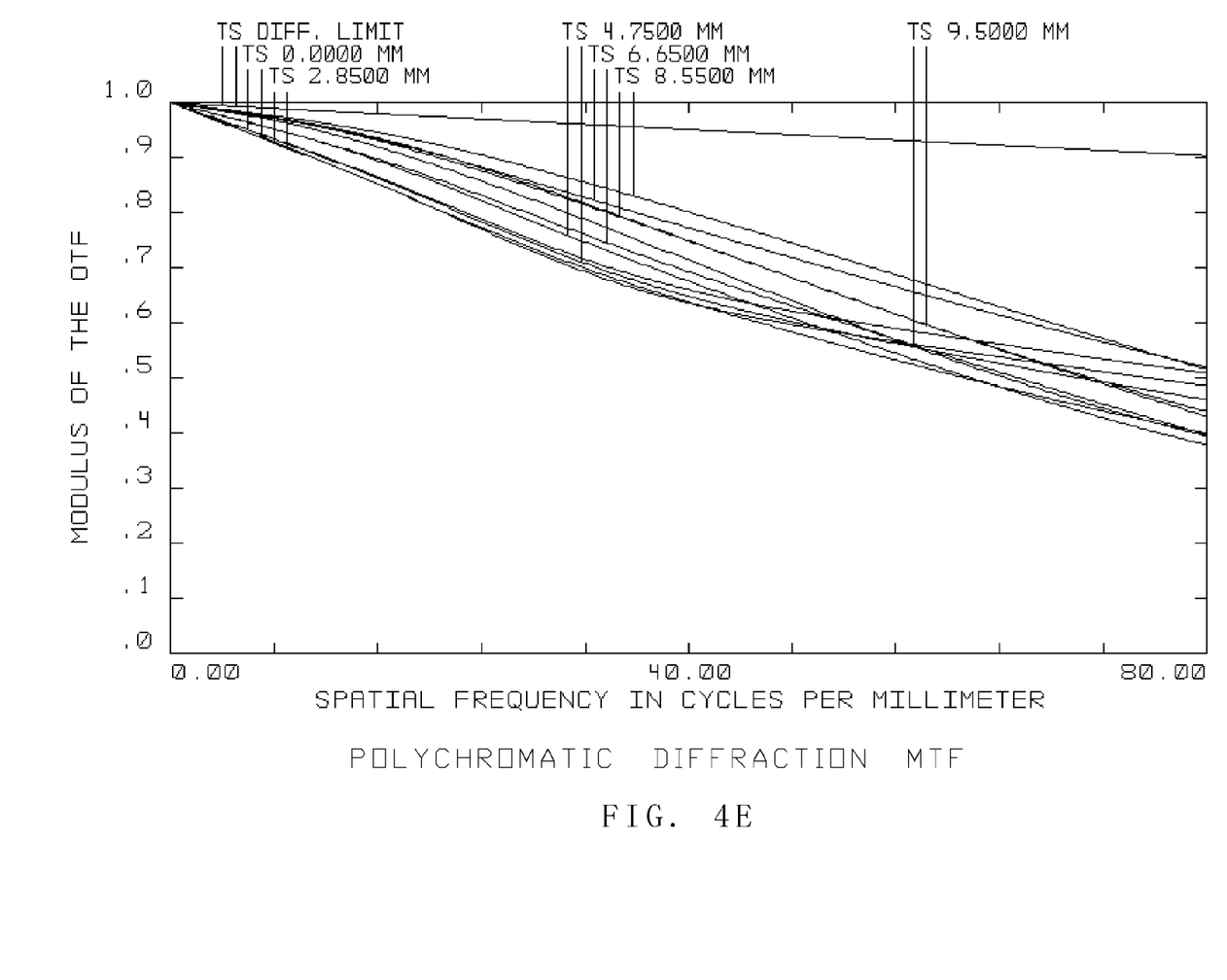

FIG. 1 shows the construction of a compact zoom lens in accordance with the concept of the present invention at the wide-angle end. The present compact zoom lens, which is positioned at the front of an optical device, may act as a projection zoom lens in an image projection device such as an LCD projector, or a zoom lens in an image pickup device such as a camera. Preferably, the present compact zoom lens is used in a high-resolution image projection device for projecting an image formed on an image-forming device (such as an LCD modulator) to a screen, and a high-resolution mobile projector in particular.

As shown in FIG. 1, the present compact zoom lens consists of, in order from an object side (a screen side for an image projection device, or an object side for an image pickup device) to an image side (the side of an image display member for an image projection device, or the side of an image forming member for an image pickup device), a first lens group 1 of negative refractive power, a second lens group 2 of positive refractive power, a third lens group 3 of positive refractive power, a fourth lens group 4 of positive refractive power and a fifth lens group 5 of positive refractive power. In addition, a cover glass 6 is disposed between the fifth lens group 5 and an image forming member or an image display group 7.

The first lens group 1 consists of three lens elements, a negative first lens element 11, a negative second lens element 12 and a biconcave third lens element 13. The first lens element 11 has an object-side convex surface R1 and an image-side concave surface R2. The second lens element 12 has an object-side convex surface R3 and an image-side concave surface R4. The third biconcave lens element 13 has opposite side surfaces R5 and R6.

The second lens group 2 consists of a positive fourth lens element 21 that has an object-side convex surface R7 and an image-side convex surface R8. The third lens group 3 also consists of a positive fifth lens element 31 that has an object-side convex surface R9 and a slightly convex image-side surface R10. The fourth lens group 4 consists of three lens elements, that is, a biconcave sixth lens element 41, a biconvex seventh lens element 42 and a positive eighth lens element 43. The sixth lens element 41 has opposite concave side surfaces R11 and R12; the seventh lens element 42 has opposite convex side surfaces R13 and R14; and the eighth lens element 43 has a slightly concave object-side surface R15 and a convex image-side surface R16. The fifth lens group 5 consists of a positive ninth lens element 51 that has a convex object-side surface R17 and a substantially planar image-side surface R18.

The first to fifth lens groups 1-5 of the present compact zoom lens include at least one aspheric lens element.

The present compact zoom lens further includes an aperture stop (not shown) that may be disposed in the fourth lens group 4.

During zooming from the wide-angle end to the telephoto end, the second lens group 2 of the present compact zoom lens moves linearly from the object side to the image side, and the third lens group 3 also moves from the object side to the image side. The distance between the second and third lens groups 2, 3 decreases. At the same time, the fourth lens group 4 moves at the same velocity as the third lens group 3 toward the image side to define a gentle curve bulging toward the image side.

The constituent lens elements of the present compact zoom lens include spherical glass lens elements and aspheric plastic lens elements formed by injection molding. Accordingly, the manufacture of the present compact zoom lens is facilitated. Optical performance variations due to temperature fluctuations can be compensated by the variable distance between two lens groups or by the back focal length. Accordingly, image quality degradation of the present compact zoom lens due to temperature changes can be mitigated.

As discussed above, when a zoom lens is employed in a reflecting-type projection optical system, for example a DLP (Digital Light Processing) projector, a reflective modulator (such as the LCD modulator) thereof requires long back focal length because the incoming light path and the reflected light path must stay separate from each other, otherwise the image will be affected. In addition, the optical projection system is required to be compact in configuration and small in overall length while properly correcting various aberrations and achieving high image quality. The present compact zoom lens meet these requirements by satisfy the following conditions as provided below.

The present compact zoom lens satisfies the following conditions:

$$0.499 < \frac{fa}{bf} \quad \text{(a-1)}$$

$$\frac{tt}{fa} < 6.36 \quad \text{(a-2)}$$

$$\frac{tt}{bf} < 3.17 \quad \text{(a-3)}$$

where fa represents the focal length of the entire compact zoom lens of the present invention at the wide-angle end, bf represents the back focal length of the entire compact zoom lens of the present invention at the wide-angle end, and tt represents the total track of the entire compact zoom lens of the present invention at the wide-angle end.

From the above condition (a-1), it can be seen that the back focal length obtained by the present invention is 2 times the entire focal length of the present compact zoom lens at the wide-angle end. This back focal length is long enough for a projection optical system.

If the lower limit of condition (a-1) is transgressed, the refractive power of the zoom lens as a whole becomes too low, which will adversely affects the optical performance of the zoom lens. If the upper limits of conditions (a-2) and (a-3) are transgressed, the movement stroke of the back focal length of the zoom lens as a whole at the wide-angle end becomes unduly long, whereby the overall length of the zoom lens is unduly long.

The present compact zoom lens also satisfies the following condition:

$$\left|\frac{ex}{bf}\right| < 8.153 \quad \text{(a-4)}$$

where ex represents the exit pupil position of the entire compact zoom lens of the present invention at the wide-angle end, and bf represents the back focal length of the entire compact zoom lens of the present invention at the wide-angle end.

If the upper limit of condition (a-4) is transgressed, the refractive power of the zoom lens as a whole becomes too low, The present compact zoom lens further satisfies the following condition:

$$0.685 < \frac{lt}{tt} \quad \text{(a-5)}$$

where lt represents the overall length from a front vertex of the first lens element 11 to a rear vertex of the last lens element 51 of the present compact zoom lens at the wide-angle end, and tt represents the total track of the entire compact zoom lens of the present invention at the wide-angle end.

If the lower limit of condition (a-5) is transgressed, the overall length of the zoom lens as a whole at the wide-angle end becomes too long and the back focal length becomes too short.

To correct various aberrations, aspheric lenses are employed by the present compact zoom lens. The first to fifth lens groups 1-5 include at least one aspheric lens. The aspheric surfaces of the aspheric lenses are expressed by the following formula:

$$\frac{X(H^2/R)}{\{1 + [1 - 2(1+K)(H/R)]^{1/2}\}} + AH^4 + BH^6 + CH^8 + DH^{10}$$

where X represents displacement in the direction of the optical axis at the position of height A from the optical axis relative to the surface vertex; R is the curvature radius of the aspheric lens surface on the optical axis; H represents a height of a point on the aspheric surface with respect to the optical axis; K represents a cone constant; and A, B, C and D are aspheric coefficients for fourth, sixth, eighth and tenth order terms.

All the construction parameters of the lens elements of the present compact zoom lens will be shown below.

In the data table given below, "i" represents the order of the surface from the object side, "Ri" represents the radius of curvature (mm) of the ith surface, "D" represents the ith member thickness or the distance (mm) between the ith surface and the (i+1)th surface, and "Nd" and "Vd" respectively represent the refractive index (d-line) and Abbe number (d-line) of the ith member. Also, "F" represents the focal length of the present zoom lens as a whole, "W" represents the wide-angle end of the present zoom lens, "M" represents an intermediate zoom position of the present zoom lens, "T" represents the telephoto end of the present zoom lens, and "FNO" represents the effective aperture of the present zoom lens.

| Surface (i) | Ri (mm) | D (mm) | Nd | Vd |
|---|---|---|---|---|
| R1 | 155 | 1.3 | 1.69895 | 30.1 |
| R2 | 52.9 | 0.1 | | |
| R3 | 59.5 | 1.4 | 1.52467 | 56.4 |
| R4 | 16.0 | 7.4 | | |

-continued

| Surface (i) | Ri (mm) | D (mm) | Nd | Vd |
|---|---|---|---|---|
| R5 | −63.2 | 0.8 | 1.49700 | 81.6 |
| R6 | 43.4 | 5.55~5.58~5.61 | | |
| R7 | 58.3 | 3.9 | 1.83000 | 37.2 |
| R8 | −107 | 9.86~1.66~0.20 | | |
| R9 | 37.2 | 3.8 | 1.77000 | 49.6 |
| R10 | −243 | 22.50~23.99~24.32 | | |
| R11 | −20.3 | 0.6 | 1.80000 | 23.8 |
| R12 | 38.8 | 1.1 | | |
| R13 | 34.9 | 4.9 | 1.49700 | 81.6 |
| R14 | −23.7 | 5.8 | | |
| R15 | 2609 | 7.2 | 1.52467 | 56.4 |
| R16 | −26.1 | 0.20~6.87~7.97 | | |
| R17 | −44.7 | 3.2 | 1.80000 | 46.6 |
| R18 | −564 | 8.0 | | |
| R19 | −21.7 | 23.44 | 1.52000 | 64.2 |
| R20 | ∞ | 1.00 | | |
| R21 | ∞ | 2.20 | 1.49000 | 70.2 |
| R22 | ∞ | 1.00 | | |

According to the present zoom lens, as shown in FIG. 1, surfaces R3 and R4 of the first lens group 1 and surfaces R15 and R16 of the fourth lens group 4 are all configured to be aspheric surfaces. That is, both the second lens element 12 and the eighth lens element 43 are aspheric plastic lens elements. Aspheric coefficients for these aspheric surfaces are illustrated below:

| | Coef. | | | | |
|---|---|---|---|---|---|
| Surface (i) | K | A | B | C | D |
| R3 | 9.237865 | 8.0000E−006 | −1.1178E−007 | 3.4213E−010 | −5.6571E−013 |
| R4 | −0.731938 | 1.7000E005 | −1.0715E−007 | 2.9376E−010 | −1.7469E−013 |
| R15 | −9752091 | −1.8000E−005 | −9.5728E−008 | 2.2113E−010 | −2.5977E−012 |
| R16 | 0.197391 | 4.0000E−006 | −3.7881E−008 | −1.1241E−011 | −8.9197E−013 |

Related performance parameters of the present compact zoom lens are provided below:

$F=18.3(W)\sim20.1(M)\sim21.9(T)$ $FNO=1.60(W)\sim1.66(M)\sim1.72(T)$

From the above performance parameters, it can be seen that the overall length of the present compact zoom lens can be reduced. The F-number of the present compact zoom lens is 1.60 at the wide-angle end and 1.72 at the telephoto end. Such a small F-number admits more light into the present zoom lens, and thus an image with enhanced brightness can be obtained.

Aberrations of the present compact zoom lens can be effectively corrected and are respectively shown in FIGS. 2A~4E, FIGS. 2A~2E show various aberrations of the present compact zoom lens at the wide-angle end; FIGS. 3A~3E show various aberrations of the present compact zoom lens at an intermediate zoom position; and FIGS. 4A~4E show various aberrations of the present compact zoom lens at the telephoto end. These aberrations include longitudinal spherical aberrations (shown in FIGS. 2A, 3A and 4A), lateral chromatic aberrations (shown in FIGS. 2B, 3B and 4B), astigmatism (shown in FIGS. 2C, 3C and 4C), distortions (shown in FIGS. 2D, 3D and 4D) and MTF (Modulation Transfer Function) curves (shown in FIGS. 2E, 3E and 4E), in which the object distance is 2 meters from the image side.

It should be understandable that, the present compact zoom lens can be used in an image projection device, such as a projector employing an LCD modulator, to make the projector compact and improve the optical performance of the projector. Moreover, the present zoom lens also can be used in an image pickup device for improving optical performance and reducing the size of the image pickup device. For facilitating understanding, when the present zoom lens is used in an image projection device, the screen surface onto which an image is projected is regarded as the object side and the surface of the image display member (for example, a projector employing an LCD modulator) is regarded as the image side; when the present zoom lens is used in an image pickup device, the object to be photographed is defined as the object side and the surface of the image forming member (a photosensitive member, for example, a CCD (Charge Coupled Display)) is defined as the image side.

As described above, according to the concept of the present invention, the present zoom lens is composed of five lens groups with a negative-positive-positive-positive-positive configuration. The number of constituent lens elements is nine in total. Zooming and focusing are both effected by the movement of the second, third and fourth lens groups. In this way, it is possible to realize a compact zoom lens having a long back focal length satisfactorily correcting various aberrations. When used in a projector employing an LCD modulator, a zoom lens embodying the present invention not only helps miniaturize the projector and enhances the performance thereof, but also makes it possible to project high-quality and enhanced-brightness images. The present compact zoom lens has a reduced overall length, and is also cost-effective since spherical glass lens elements (which are the majority) and aspheric plastic lens elements are employed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens comprising, in order from an object side to an image side, a first lens group of negative refractive power, a second lens group of positive refractive power, a third lens group of positive refractive power, a fourth lens group of positive refractive power and a fifth lens group of positive refractive power; wherein, during zooming from the telephoto end to the wide-angle end, the fourth lens group moves from the object side to the image side, and the zoom lens satisfies the following condition:

$$0.499 < \frac{fa}{bf}$$

where fa represents the focal length of the zoom lens at the wide-angle end, and bf represents the back focal length of the zoom lens at the wide-angle end.

2. The zoom lens as claimed in claim 1, wherein, during zooming from the wide-angle end to the telephoto end, the second lens group moves from the object side to the image side.

3. The zoom lens as claimed in claim 2, wherein, during zooming from the wide-angle end to the telephoto end, the third lens group moves from the object side to the image side.

4. The zoom lens as claimed in claim 3, wherein the fourth lens group moves toward the image side at the same velocity as the third lens group.

5. The zoom lens as claimed in claim 1, satisfying the following condition:

$$\frac{tt}{fa} < 6.36$$

where tt represents the total track of the zoom lens at the wide-angle end, and fa represents the focal length of the zoom lens at the wide-angle end.

6. The zoom lens as claimed in claim 5, satisfying the following condition:

$$\frac{tt}{bf} < 3.17$$

where tt represents the total track of the zoom lens at the wide-angle end, and bf represents the back focal length of the zoom lens at the wide-angle end.

7. The zoom lens as claimed in claim 6, satisfying the following condition:

$$\left|\frac{ex}{bf}\right| < 8.153$$

where ex represents the exit pupil position of the zoom lens at the wide-angle end, and bf represents the back focal length of the zoom lens at the wide-angle end.

8. The zoom lens as claimed in claim 7, satisfying the following condition:

$$0.685 < \frac{lt}{tt}$$

where lt represents the overall length from a front vertex of the first lens element to a rear vertex of the last lens element of the zoom lens at the wide-angle end, and tt represents the total track of the zoom lens at the wide-angle end.

9. The zoom lens as claimed in claim 1, wherein the first to fifth lens groups include at least one aspheric lens element.

10. The zoom lens as claimed in claim 9, wherein the fourth lens group includes an aspheric lens element.

11. The zoom lens as claimed in claim 10, wherein the first lens group includes an aspheric lens element.

12. The zoom lens as claimed in claim 11, wherein said aspheric lens element is made of plastic.

13. The zoom lens as claimed in claim 12, wherein the spherical lens elements of the first to fifth lens groups are made of glass.

14. The zoom lens as claimed in claim 13, further comprising an aperture stop disposed in the fourth lens group.

15. The zoom lens as claimed in claim 14, wherein the first lens group comprises a first lens element having a convex object-side surface and a concave image-side surface.

16. The zoom lens as claimed in claim 15, wherein the first lens group further comprises a second lens element having a convex object-side surface and a concave image-side surface.

17. The zoom lens as claimed in claim 16, wherein the first lens group further comprises a third biconcave lens element.

18. The zoom lens as claimed in claim 17, wherein the second lens group consists of a fourth lens element, the fourth lens element having a convex object-side surface and a convex image-side surface.

19. The zoom lens as claimed in claim 18, wherein the third lens group consists of a fifth lens element, the fifth lens element having a convex object-side surface and a slightly convex image-side surface.

20. The zoom lens as claimed in claim 19, wherein the fourth lens group comprises a biconcave sixth lens element.

21. The zoom lens as claimed in claim 20, wherein the fourth lens group further comprises a biconvex seventh lens element.

22. The zoom lens as claimed in claim 21, wherein the fourth lens group further comprises an eighth lens element, the eighth lens element having a slightly concave object-side surface and a convex image-side surface.

23. The zoom lens as claimed in claim 22, wherein the fifth lens group consists of a nineth lens element, the nineth lens element having a convex object-side surface and a substantially planar image-side surface.

* * * * *